United States Patent [19]

Bierhoff et al.

[11] Patent Number: 4,683,561
[45] Date of Patent: Jul. 28, 1987

[54] SMOOTH LOCK-IN OF SERVO CONTROL WHEN SWITCHED ON

[75] Inventors: Martinus P. M. Bierhoff; Hubertus M. M. Lonij, both of Eindhoven, Netherlands

[73] Assignee: U.S. Philips Corporation, New York, N.Y.

[21] Appl. No.: 774,418

[22] Filed: Sep. 10, 1985

[30] Foreign Application Priority Data

May 28, 1985 [NL] Netherlands .......................... 8501509

[51] Int. Cl.⁴ .............................................. G11B 7/00
[52] U.S. Cl. ......................................... 369/45; 369/46
[58] Field of Search ..................................... 369/44–46; 250/201 DF; 358/342

[56] References Cited

U.S. PATENT DOCUMENTS 4,280,215  7/1981  Okano ................................... 369/45
4,607,157  8/1986  Millar et al. ...................... 369/45 X Primary Examiner—Robert L. Richardson
Attorney, Agent, or Firm—Thomas A. Briody; Jack Oisher; William J. Streeter

[57] ABSTRACT

An apparatus for playing optical discs is described, in which for a smoother locking-in of the focus servo control the focussing error signal is initially derived from the amplitude of the h.f. signal, followed by a gradual change-over to a difference signal derived by means of subdetectors. In this way the focus control point with the servo loop closed is shifted towards the desired in-focus point.

5 Claims, 6 Drawing Figures

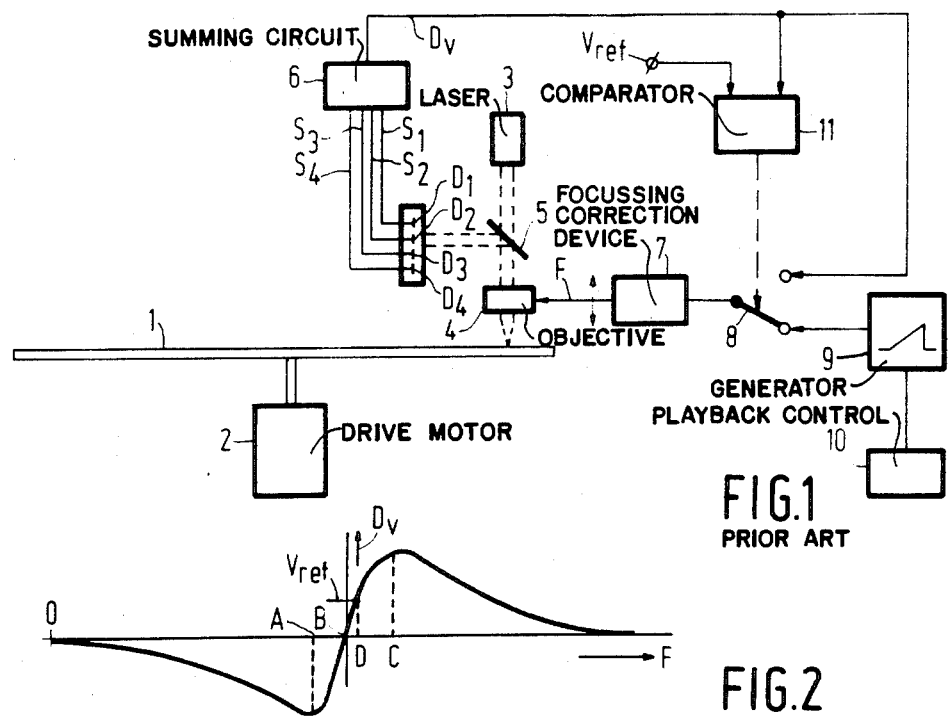
FIG.1 PRIOR ART
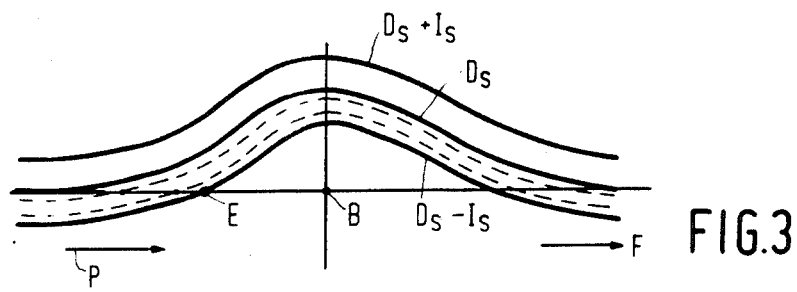
FIG.2
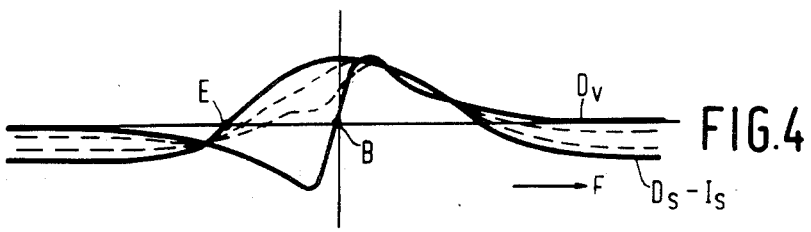
FIG.3
FIG.4

SMOOTH LOCK-IN OF SERVO CONTROL WHEN SWITCHED ON

BACKGROUND OF THE INVENTION

The invention relates to an apparatus for projecting a light beam onto an optically readable record carrier, which apparatus comprises an optical detector having at least two subdetectors for detecting the light beam which has been modulated by the record carrier, a focussing device for focussing the light beam on the record carrier, a circuit for generating a focussing error signal which comprises a first signal corresponding to the difference between the two signals supplied by the subdetectors, and a focussing correction device for adjusting the focussing device in response to the focussing error signal.

When such an apparatus is switched on it is common practice to disconnect the focussing error signal from the focussing device by means of a switch and to apply an increasing signal to the focussing correction device in order to move the focussing correction device towards the record carrier. In the meantime the focussing error signal is monitored to detect whether the desired control point is approached within a specific range and subsequently apply the focussing error signal again, after which the control loop is closed and the focussing is controlled by means of the focussing error signal.

In order to obtain a correct servo control the response of the focussing error signal near the in-focus point should be high. However, this results in oscillations about the in-focus point when the known lock-in method is used.

SUMMARY OF THE INVENTION

It is the object of the invention to provide an oscillation-free lock-in method and to this end the invention is characterized in that the circuit is adapted to initially generate as the focussing error signal a second signal corresponding to the sum of the signals supplied by the subdetectors minus a first threshold signal or offset current and subsequently to change over gradually from said second signal to the first signal.

The invention is based on the recognition of the fact that in the apparatus in accordance with the present invention initially a lock-in point with a low response is obtained and this lock-in point is gradually shifted towards the desired in-focus point with a high response, so that the desired in-focus point is reached gradually in spite of the high response around this point.

The invention may be characterized further in that the circuit is further adapted to generate a third signal prior to the generation of said signal sum minus said threshold signal. The third signal corresponds to said signal sum plus a second threshold signal or offset current. The third signal is caused to change over to the second signal prior to the change-over from the second signal to the first signal.

In this way it is achieved that the lock-in point is shifted from the initial setting.

A preferred embodiment of the invention is characterized further in that in comparison with said sum the third signal is incremented by a second threshold signal of the same polarity as the first threshold signal.

This step ensures that prior to locking-in the focussing device is actively controlled at the initial point.

Embodiments of the invention will now be described in more detail, by way of example, with reference to the accompanying drawings.

BRIEF DESCRIPTION OF THE DRAWING

FIG. 1 shows a known apparatus for reading an optical record carrier,

FIG. 2 shows the focussing-error signal as a function of the distance F of the objective from the record carrier relative to a reference point o, FIG. 3 shows an alternative focussing-error signal as a function of the distance F to illustrate the operation of the apparatus in accordance with the invention, FIG. 4 is a diagram to explain the shift of the focus control point during locking-in in an apparatus in accordance with the invention.

DESCRIPTION OF THE PREFERRED EMBODIMENTS

Figure 5:
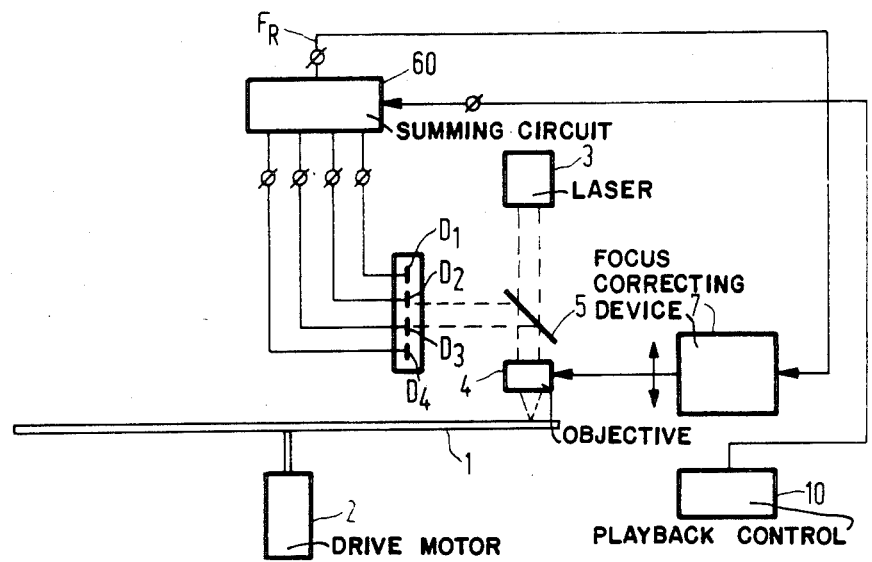
FIG. 5 shows schematically an embodiment of the invention.

FIG. 1 shows a known apparatus for reading an optical record carrier 1 insofar as it is relevant to the focussing. The record carrier 1 is rotated by means of a drive motor 2. An objective 4 projects the light from a laser 3 onto the record carrier 1. A semitransparant mirror 5 projects the reflected light onto four diodes $D_1$, $D_2$, $D_3$ and $D_4$ in such a way that the diode signals $S_1$, $S_2$, $S_3$ and $S_4$ provide information on the location of the light spot formed by the beam relative to the track on the record carrier and information on the degree of focussing. The focussing information may be provided by the signal $D_v$ which is generated by means of a circuit 6 in conformity with the equation $D_v = (S_1 + S_4) - (S_2 + S_3)$. This signal $S_v$ is applied to a focussing correction device 7 by means of which the objective 4 can be moved.

FIG. 2 shows the signal $D_v$ as a function of the distance F of the objective from the record carrier 1. If $0 < F < B$ this signal is negative, and the objective is moved towards the focus B, and if $F > B$ the signal is positive and the objective is braked and moved towards the record carrier. Thus, controlling is effected in such a way that the objective is situated at a distance $F = B$. This control system operates correctly only within the range $A < F < C$ where the signal $D_v$ is very steep. In order to bring the objective within this range after starting of the record carrier, it is known to render the control loop inoperative by means of a switch 8 and to move the objective from position $F = 0$ towards the record carrier by applying an increasing voltage from a generator 9 which is started by a playback control device 10. In the meantime a comparator 11 compares the signal $D_v$ with a reference voltage $V_{ref}$ which is such that for $D_v = V_{ref}$ the objective is situated at a distance $F = D$ within the range $A < F < C$. At this instant the comparator 11 causes the switch 7 to change over to apply the signal $D_v$ to the objective control loop 7.

The known system has the disadvantage that in the range $A < F < C$ a large steepness, and consequently a high gain, is required for an accurate control to the in-focus point $F = B$, which may lead to oscillations about point $F = B$ during locking-in. In accordance with the invention this can be avoided by moving the objective 4 to the in-focus point $F = B$ in a controlled manner by creating a lock-in point $F < B$, which is subsequently shifted gradually towards point B. This is achieved by taking the diode signal $D_s = S_1 + S_2 + S_3 + S_4$ and subtracting a value $I_s$ from this signal, which will be explained by means of FIG. 3.

FIG. 3 shows the diode sum signal $D_S$, the diode sum signal $D_s$ plus a value $I_s$, and the signal $D_v$ minus the value $I_s$. The signal $D_S + I_s$ is always positive and ensures that the objective remains clear of the record carrier at position $F = 0$. When starting $D_s + I_s$ is gradually caused to change to $D_v - I_s$, the objective will move from $F = 0$ to $F = C$, as will be apparent from the intersections of the dashed curves between the signals $D_v$ and $D_v - I_s$. Thus, the objective moves in the direction indicated by the arrow P from point $F = 0$ to point $F = E$ when the control loop is closed.

Subsequently, while the control loop is closed, the objective is moved towards point $F = B$ by causing the signal $D_s - I_s$ to change gradually to the signal $D_v$ (FIG. 2), which is illustrated by FIG. 4 which shows the intersections of the zero-axis with the dashed curves between the signals $D_2 - I_s$ and $D_v$ in accordance with which the objective moves from position $F = E$ to position $F = B$. Once the change to the signal $D_v$ is completed, the objective is locked-in at position $F = B$.

By the use of the lock-in method in accordance with the invention the device shown in FIG. 1 is modified to a device as shown in FIG. 5, in which the switch 8, the comparator 11 and the sawtooth generator 9 have been dispensed with and the circuit 6 which generates the signal $D_v$ is replaced by a circuit 60 which generates a focus control signal $F_R$ by means of the method described with reference to FIGS. 3 and 4, which circuit 60 is started by the device 10. During locking-in the control loop remains closed via the device 7.

Figure 6:
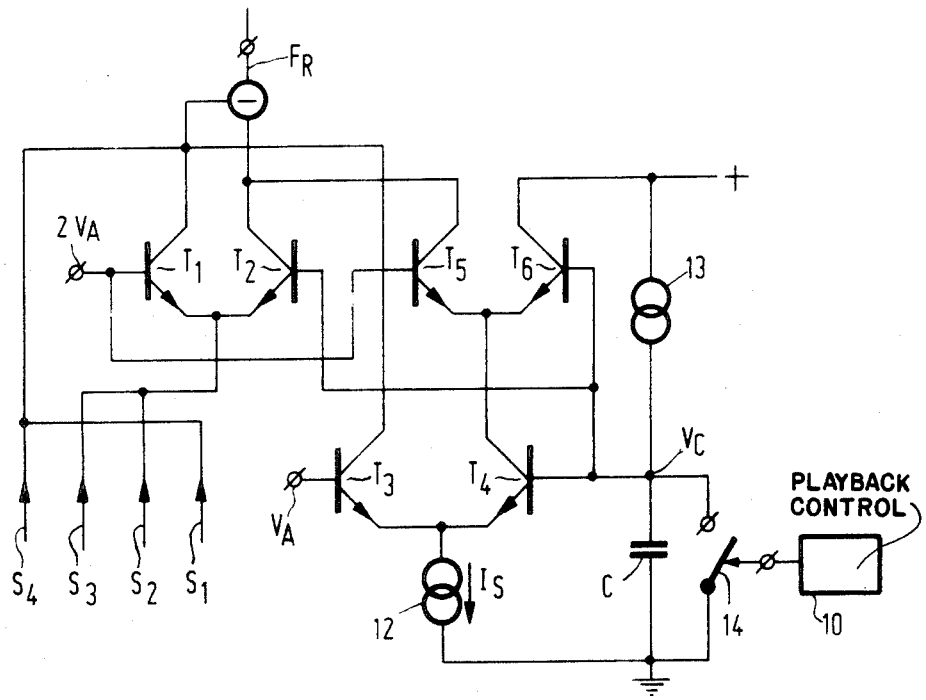
FIG. 6 shows the circuit 60 in FIG. 5 in more detail.

FIG. 6 shows an example of a circuit 60 for generating the control signal $F_R$, the signals $S_1$ to $S_4$ being supplied by highimpedance sources, i.e. by current sources. The sum of the signals $S_2$ and $S_3$ is the tail current applied to a long-tailed pair comprising transistors $T_1$ and $T_2$. The collector currents of the transistors $T_1$ and $T_2$ are subtracted from each other and applied to the focussing device 7 as the focussing error signal $F_R$. The base of the transistor $T_1$ is connected to a source supplying a suitable reference voltage $2V_A$ and the base of the transistor $T_2$ is connected to a capacitor C which is at a voltage $V_c$. The sum of the signals $S_1$ and $S_4$ is added to the collector current of the transistor $T_1$. The fixed current $I_s$ is supplied to the emitters of the transistors $T_3$ and $T_4$ by a current source 12. The base of the transistor $T_3$ is connected to a source of a suitable reference voltage $V_a$ and the base of the transistor $T_4$ is connected to a capacitor C. The collector current of the transistor $T_3$ is added to the collector current of the transistor $T_1$ and the collector current of the transistor $T_4$ is applied to the emitters of the transistors $T_5$ and $T_6$. The transistors $T_5$, $T_6$ and the transistors $T_1$, $T_2$ are driven by voltages $2V_A$ and $V_C$. The collector current of the transistor $T_6$ is drained and the collector current of the transistor $T_5$ is added to the collector current of the transistor $T_2$. The capacitor C is charged by means of a current source 13, whose value in combination with the capacitance of the capacitor C determines the rise time of the voltages $V_C$ and hence the speed of the lock-in process. The capacitor C is short-circuited by a switch 14 which is opened by the control device 10 to start the lock-in process.

When the switch 14 is closed the capacitor C is short-circuited and the voltage $V_C = 0$. Assuming that the voltage $V_A$ and $2V_A$ are sufficiently high, transistors $T_1$, $T_3$ and $T_5$ will be conductive and transistors $T_2$, $T_4$ and $T_6$ will be cut off. The signal $I_s + S_1 + S_2 + S_3 + S_4 = I_s + D_s$ (upper curve in FIG. 3) will then appear on the output $F_R$.

When the switch 14 is closed the voltage $V_C$ increases, which initially results in the current $I_s$ being gradually taken over from the transistor $T_3$ by the transistor $T_4$ and the sign of the output signal $F_R$ being inverted. Consequently, $F_R$ changes from $D_s + I_s$ to $D_s - I_s$ (in conformity with FIG. 3). A further increase of $V_C$ results in current being taken over from the transistors $T_1$ and $T_5$ by the transistors $T_2$ and $T_6$, respectively. For the transistors $T_5$ and $T_6$ this means that the current $I_s$ is gradually drained to the power supply instead of to the output $F_R$, whilst the tail current $S_2 + S_3$ is taken over by the transistor $T_2$ and appears inverted in the output signal $F_R$. The signal $F_R$ then changes gradually from $D_s - I_s$ to $D_V$ (situation shown in FIG. 4).

It is to be noted that the system described here is a system comprising four subdetectors arranged in line. However, the invention also relates to other system. For example, a known system is to arrange four detectors in the four quadrants of a rectangular array. The difference signal $D_V$ is then formed by the sum of the signals from the subdetectors disposed on one of the diagonals minus the sum of the signals from the subdetectors disposed on the other diagonal. Another known system is a first detector surrounded by an annular second detector. The signal $D_V$ is then the difference between the two signals from these detectors and the signal $D_s$ is the sum of these signals.

What is claimed is:

1. In an apparatus of the kind for projecting a light beam onto an optically readable record carrier and detecting the light beam reflected therefrom and having at least two subdetectors for detecting the light beam which has been reflected from the record carrier, a focussing device for focussing the light beam on the record carrier, generating circuit means for generating a focussing error signal which comprises a first signal corresponding to the difference between two signals supplied by the subdetectors, and a focussing correction device for adjusting the focussing device in response to the focussing error signal, the improvement wherein said generating circuit means initially generates as the focussing error signal a second signal corresponding to the sum of the signals supplied by the subdetectors minus a first threshold signal and subsequently gradually changes over said focussing error signal from said second signal to said first signal.

2. The invention as claimed in claim 1 wherein said generating circuit means generates as the focussing error signal a third signal prior to the generation of said second signal, said third signal corresponding to the sum of the signals supplied by the subdetectors plus a second threshold signal and changes said focussing error signal from said third signal to said second signal prior to changing said focussing error signal from said second signal to said first signal.

3. The invention as claimed in claim 2 wherein the first and second threshold signals are equal.

4. Means for providing a smooth locking-in of a servo control when said servo control is switched on, comprising:

moveable means moveable toward and away from a controlled position;

correction means for moving said moveable means in response to a position error signal;

detector means for supplying a signal representative of the position of said moveable means;

generating means coupled to said detector means for receiving said signal from said detector means and generating therefrom a first signal as the position error signal, and for supplying the position error signal to said correction means whereby said correction means is caused to move said moveable means toward said controlled position;

and wherein said generating means, when said servo control is first switched on, first generates as the position error signal a second signal that corresponds to the signal from said detector means minus a first offset signal and subsequently gradually changes over said position error signal from said second signal to said first signal.

5. In a servo control having a moveable member, means for moving said moveable member, detector means for supplying a signal representation of the position of said moveable means, and servo error generating means coupled to said detector means for generating a servo error signal and supplying said error signal to said moving means to cause said moving means to move said moveable member in response thereto, the improvement wherein said generating means, when said servo control is first switched on, first generates and supplies to said moving means a signal corresponding to a signal from said detector means plus an offset signal, then changes over to a signal corresponding to a signal from said detector means minus an offset signal, and then changes over to said servo error signal whereby a smooth lock-in of said servo control is provided when said servo control is switched on.

* * * * *